United States Patent
Sekioka et al.

[11] Patent Number: 6,030,440
[45] Date of Patent: Feb. 29, 2000

[54] WATER-BASED PIGMENT-TYPE INK AND INK JET PRINTER

[75] Inventors: Chiaki Sekioka; Masaru Sugie; Kohei Kiyota; Hiroyuki Ohyama, all of Inagi, Japan

[73] Assignee: Fujitsu Isotec Limited, Tokyo, Japan

[21] Appl. No.: 09/031,915

[22] Filed: Feb. 27, 1998

[30] Foreign Application Priority Data

Dec. 19, 1997 [JP] Japan .................................. 9-350890

[51] Int. Cl.⁷ .................................. C09D 11/02
[52] U.S. Cl. .................................. 106/31.65; 106/31.64
[58] Field of Search .................................. 106/31.64, 31.65, 106/31.69, 31.86, 31.6

[56] References Cited

U.S. PATENT DOCUMENTS

| | | | |
|---|---|---|---|
| 3,615,749 | 10/1971 | Cramer et al. | 106/31.75 |
| 3,928,226 | 12/1975 | McDonough et al. | 106/31.64 |
| 5,690,721 | 11/1997 | Itoh | 106/31.13 |
| 5,736,606 | 4/1998 | Yanagi et al. | 524/547 |
| 5,803,958 | 9/1998 | Katsen et al. | 106/31.65 |

FOREIGN PATENT DOCUMENTS

| | | |
|---|---|---|
| 196 54 752 A1 | 7/1997 | Germany . |
| 7-292302 | 11/1995 | Japan . |
| WO95/21897 | 8/1995 | WIPO . |

OTHER PUBLICATIONS

Patent Abstracts of Japan, C–1104, vol. 17, No. 478, Aug. 31, 1993 & JPA 5 117569, May 14, 1993.
Patent Abstracts of Japan, C–229, vol. 8, No. 130, Jun. 16, 1984 & JPA 59 43076, Mar. 9, 1984.
Patent Abstracts of Japan, C–872, vol. 15, No. 388, Oct. 2, 1991 & JPA 3 157464, Jul. 5, 1991.

*Primary Examiner*—Helene Klemanski
*Attorney, Agent, or Firm*—Nikaido, Marmelstein, Murray & Oram LLP

[57] ABSTRACT

A water-based pigment-type ink containing at least water, a pigment and a dispersant, the pigment particles having an average particle diameter of not larger than 0.1 μm, the weight ratio of the pigment to the dispersant being from 1.2 to 5. The water-based pigment-type ink exhibits more excellent color tone and chroma, by adding the fluorescent pigment in an amount of from 0.1% by weight to 3% by weight with respect to the amount of the ink. Furthermore, the water-based pigment-type ink comprises at least a pigment, a high-molecular dispersant, a surfactant and water, the pigment particles having an average particle diameter of not larger than 80 nm, a maximum particle diameter not being larger than 0.1 μm, the high-molecular dispersant being added in an amount of from 3% by weight to 20% by weight with respect to the amount of the ink, and the surfactant being added in an amount of from 2% by weight to 4% by weight with respect to the amount of the ink.

7 Claims, 3 Drawing Sheets

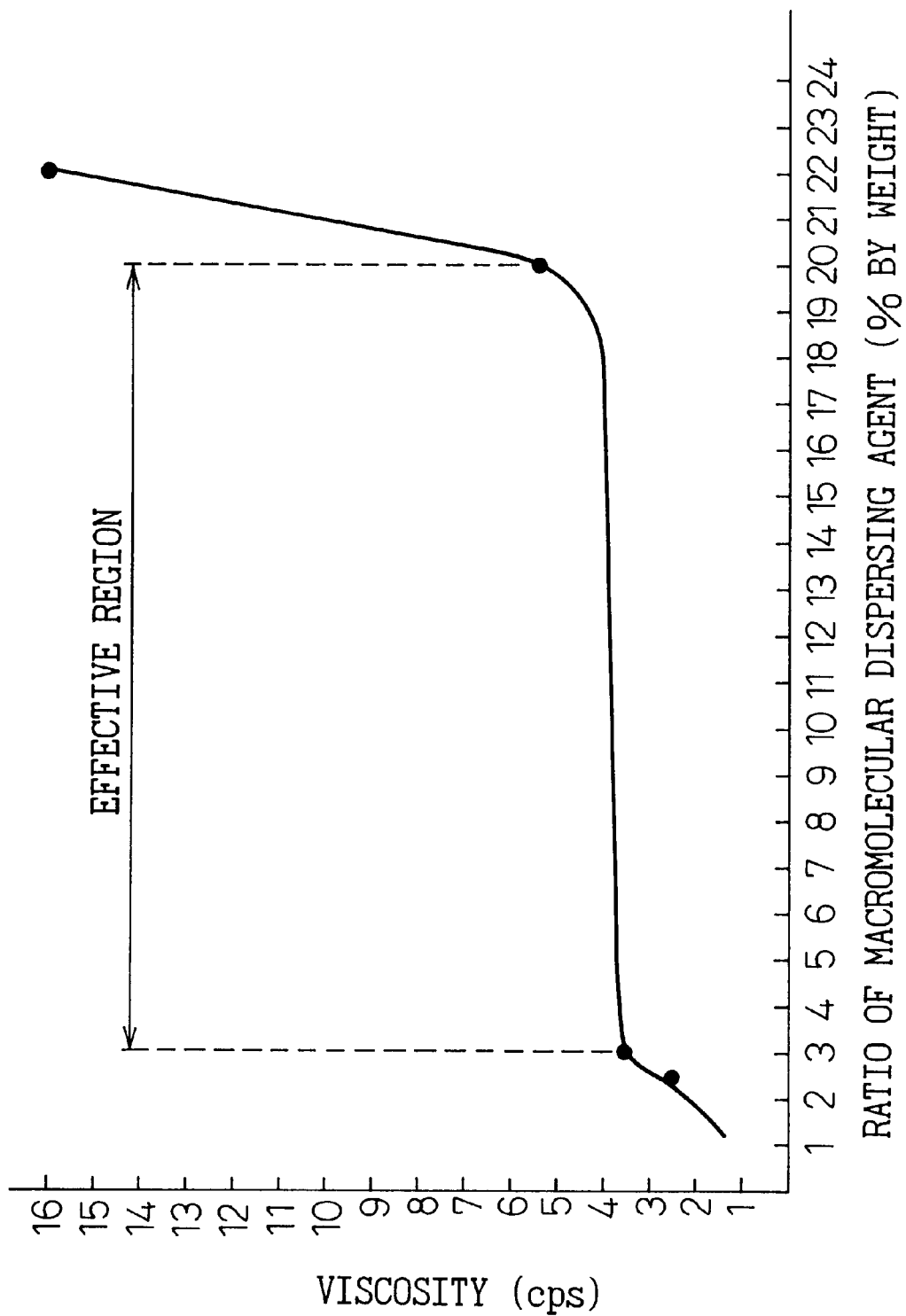

WATER-BASED PIGMENT-TYPE INK AND INK JET PRINTER

BACKGROUND OF THE INVENTION

1. Field of the Invention

The present invention relates to a water-based pigment-type ink that can be preferably used for an ink-jet recorder, and to an ink-jet printer for multi-color printing, using the water-based pigment-type inks.

2. Description of the Related Art

Ink-jet printers have been extensively used for effecting printing by ejecting inks through nozzles of very small diameters. According to this recording system, the liquid ink is ejected onto a recording medium as flying particles from nozzles (orifices) of a very small diameter, so that flying particles of the ink adhere onto the recording medium to thereby form characters, images and the like.

An ink-jet printer of this type generally employs inks of the type obtained by dissolving various dyestuffs in water or in an organic solvent. However, the dyestuff inks are inferior in regard to fastness to light and water resistance, and are not suited where the recorded image requires fastness to light or water resistance.

In recent years, therefore, it has been proposed to use pigment inks instead of dyestuff inks. When pigment-type inks are to be used for the ink-jet printer, it has been proposed to add particular additives to pigment-type inks or to prepare pigment-type inks in particular compositions to improve the dispersion stability. That is, in the pigment-type inks, the pigment components coagulate or settle in the ink solutions, since the pigments exhibit poor affinity to the water. Upon adding the additives or forming the inks in particular compositions, however, it becomes possible to suppress the coagulation or settlement.

Japanese Unexamined Patent Publication (Kokai) No. 7-292302 discloses a recording solution used for a device for effecting a non-contact non-impact recording by ejecting an ink containing pigment particles. This publication teaches that a difference C (=A−B) of weight between a nonvolatile component (A) and a color component (B) should be 0.01 C<10 in the recording solution at 25° C. This publication further discloses the use of a plurality of color inks inclusive of a black ink, and specifies the ratio (=B/A) of the nonvolatile component (A) to the color component (B) to be not larger than 0.5 in the recording solutions at 25° C.

Furthermore, WO95/21897 discloses a water ink composition containing a water-insoluble coloring material, a water-soluble organic solvent and water, without substantially containing a dispersant, said water-insoluble coloring agent having a solubility in water of not larger than 1% by weight at 20° C. but being soluble in said water-soluble organic solvent, and said water-insoluble coloring agent being dispersed in the ink composition.

Thus, pigment-type inks have heretofore been proposed having ink compositions in which the amount of the additive which is a dispersant is set to a particular ratio, or the solubility is set to lie within a particular range without substantially containing dispersant.

As described above, the dyestuff or the pigment has heretofore been used by being dissolved in, and decomposed by, a high-boiling solvent and water. However, the dyestuff involves a problem in regard to fastness to light and water resistance, and the pigment involves a problem in regard to coagulation and settlement.

The pigment-type ink is superior to the dyestuff-type ink in regard to fastness to light and water resistance, but permits a pigment component having poor affinity to water to be coagulated or settle in the ink solution. Therefore, when the conventional pigment-type ink is used directly for the ink-jet printer, the ink is ejected from the nozzles (orifices) of the ink-jet head lacking stability to a conspicuous degree, and the printing becomes defective. This tendency is observed by either the type using heat energy or the type using pulse pressure; i.e., an ink residue formed near the orifices prevents stable ejection of the ink.

The ink-jet printer for multi-color printing uses a plurality of color inks inclusive of a black ink. That is, there are used black, yellow, magenta and cyan inks. In recent years, carbon black has been used as a pigment for a black ink owing to its excellent fastness to light and water resistance. However, when the carbon black is used in the ink-jet printer, black appears to be somewhat reddish brown when black exists among other colors, causing the quality of multi-color print to be deteriorated.

SUMMARY OF THE INVENTION

The object of the present invention is to provide a water-based pigment-type ink which can be stably ejected at all times without being clogged even when it is used under varying drive conditions in the ink-jet printer for extended periods of time, and an ink-jet printer.

Another object of the present invention is to provide a water-based pigment-type ink having a good color tone concerning brightness and vividness, exhibiting excellent fastness to light and water resistance, without being blurred and without crossing boundaries relative to other colors, and an ink-jet printer.

It has generally been attempted to add a dispersant to an ink that contains a pigment in an attempt to improve its affinity to the water. A polymer is a preferred example of the dispersant, and it is desired that the polymer is used in an amount of 1.2 to 5 times as large as the pigment in terms of a weight ratio. To suppress the coagulation or settlement of pigment particles in the ink solution, furthermore, it is desired that the pigment particles have a maximum diameter of not larger than 0.1 μm.

The present invention therefore provides a water-based pigment-type ink containing at least water, a pigment, a dispersant and a fluorescent pigment, the pigment particles having an average particle diameter of not larger than 0.1 μm, the weight ratio of the dispersant to the pigment being from 1.2 to 5, and the fluorescent pigment being added in an amount of from 0.1% by weight to 3% by weight with respect to the amount of the ink.

A pigment that is used as a coloring material does not usually appear vivid since it permits light to pass through less than a dyestuff. In the water-based pigment-type ink of the present invention, however, a fluorescent pigment has been added by a suitable amount, i.e., in an amount of from 0.1% by weight to 3% by weight with respect to the amount of the ink. Therefore, the chroma increases to a level same as that of the dyestuff-type ink and the printing quality can be improved. Therefore, the water-based pigment-type ink exhibits excellent color tone and brightness, and enables the chroma to be enhanced by about 5%. When the pigment-type ink of this composition is used for the ink-jet printer, there are printed characters having excellent fastness to light and water resistance. Besides, since the pigment particles are suppressed from being coagulated or settled, the ink droplets can be stably ejected.

When the pigment particles have an average particle diameter of not larger than 0.1 μm, clogging usually does not occur. To obtain a more stable recording liquid, it is desired that the pigment particles have an average particle diameter of not larger than 50 nm. When the pigment and the dispersant exist at a nearly equal ratio in the water ink composition, or when the ratio of the pigment is greater than the ratio of the dispersant, settlement occurs in about a week. When the ratio of the dispersant to the pigment exceeds 5 times, the viscosity of the ink rapidly increases, and the ink can no longer be used for the ink-jet printer. It is therefore determined that the polymer which is the dispersant is used in an amount of 1.2 to 5 times as great as the amount of the pigment in terms of a weight ratio.

The polymer which is a dispersant to be added to the ink comprises one or more of those selected from the group consisting of a polybutyl/butyral resin, a cellulose derivative, a styrene/acrylic copolymer resin, a maleic acid/styrene copolymer, and a block polymer of a hydrophobic polymer having a basic amino group and of a hydrophilic polymer having an acidic functional group.

The water-based pigment-type ink further contains a water-soluble organic solvent in an amount of from 1 to 20% in terms of a weight ratio. Preferably, the water-soluble organic solvent is a single solvent or a mixture solvent of polyhydric alcohol such as diethylene glycol.

Furthermore, an ink-jet printer according to the present invention comprises ink tanks of a plurality of colors and a printer head having nozzles for ejecting inks of the plurality of colors, each of said ink tanks containing a water-based pigment-type ink which contains at least water, a pigment and a dispersant, the pigment particles having an average particle diameter of not larger than 0.1 $\mu$m, and the weight ratio of the dispersant to the pigment being from 1.2 to 5, and the diameter of the nozzles of said printer head being variable over a range of from 20 $\mu$m to 50 $\mu$m depending upon the color of the pigment.

When the particle diameter of pigment is as small as 20 nm such as of yellow pigment, the diameter of the nozzles of the ink-jet head is decreased to be about 20 $\mu$m. When the particle diameter of pigment in the ink is as large as 35 to 36 nm such as of Cyan or Magenta, the diameter of the nozzles of the head is increased to be about 50 $\mu$m. This enables the droplet diameter (volume of droplet) of the ink ejected from the nozzles to become nearly constant irrespective of the particle diameter of the pigment.

Furthermore, a fluorescent pigment is added in an amount of 0.1% by weight to 3% by weight with respect to the amount of the ink. The diameter of the nozzles is nearly the same for a yellow pigment and for a black pigment, is nearly the same for a Magenta pigment and for a Cyan pigment, and is different for a group of yellow and black, and for a group of Magenta and Cyan.

According to the present invention, furthermore, the ink-jet printer comprises ink tanks of a plurality of colors and a printer head having nozzles for ejecting inks of the plurality of colors, each of said ink tanks containing a water-based pigment-type ink which contains at least water, a pigment and a dispersant, the pigment particles having an average particle diameter of not larger than 0.1 $\mu$m, and the weight ratio of the dispersant to the pigment being from 1.2 to 5, said ink-jet printer further comprising a means capable of changing the size of the ink droplets injected from the nozzles in at least three steps.

Desirably, means for changing the size of the ink droplets ejected from the nozzles includes means for changing at least the magnitude of pulse voltage applied for ejecting the ink droplets, the width of pulse voltage, or the rising time of pulse voltage.

Furthermore, the ink-jet printer of the present invention comprises ink tanks of a plurality of colors inclusive of black and a printer head having nozzles for ejecting inks of the plurality of colors, each of said ink tanks containing a water-based pigment-type ink which contains at least water, a pigment and a dispersant, the pigment particles having an average particle diameter of not larger than 0.1 $\mu$m, and the weight ratio of the dispersant to the pigment being from 1.2 to 5, and said black ink containing carbon black and a Cyan-type pigment. In this case, too, the dispersant comprises one or more of those selected from the group consisting of a polybutyl/butyral resin, a cellulose derivative, a styrene/acrylic copolymer resin, a maleic acid/styrene copolymer, and a block polymer of a hydrophobic polymer having a basic amino group and of a hydrophilic polymer having an acidic functional group.

The water-based pigment-type ink further contains a water-soluble organic solvent in an amount of from 1 to 20% in terms of a weight ratio. The water-soluble organic solvent is a single solvent or a mixed solvent of polyhydric alcohol. Moreover, the black ink is brought into match with the center of balance of hue of color inks.

There is further provided a black ink for an ink-jet printer, containing carbon black and a Cyan-type pigment.

According to the present invention, furthermore, there is provided a water-based pigment-type ink for an ink-jet printer comprising at least a pigment, a high-molecular dispersant, a surfactant and water, the pigment particles having an average particle diameter of not larger than 80 nm, a maximum particle diameter not being larger than 0.1 $\mu$m, the high-molecular dispersant being added in an amount of from 3% by weight to 20% by weight with respect to the amount of the ink, and the surfactant being added in an amount of from 2% by weight to 4% by weight with respect to the amount of the ink. Since the pigment particles have an average particle diameter of not larger than 80 nm, clogging usually does not occur when the ink is ejected from the nozzles of the ink-jet head. In order to obtain a more stable ink as a recording liquid, it is desired that the pigment particles have an average particle diameter of not larger than 50 nm.

Upon adding a high-molecular dispersant in an amount of from 3% to 20% with respect to the ink, furthermore, it is possible to maintain dispersion stability. By adding a surfactant in an amount of from 2% by weight to 4% by weight with respect to the amount of the ink, furthermore, it is possible to effect smooth printing.

According to the present invention, furthermore, there is provided a water-based pigment-type ink comprising at least a pigment, a high-molecular dispersant, a surfactant and water, the pigment particles having an average particle diameter of not larger than 80 nm, a maximum particle diameter being not larger than 0.1 $\mu$m, the high-molecular dispersant being added in an amount of from 3% by weight to 20% by weight with respect to the amount of the ink and added at a ratio higher than that of the pigment, and the surfactant being added in an amount of from 2% by weight to 4% by weight with respect to the amount of the ink.

When the pigment and the dispersant are contained nearly at an equal ratio in the water ink composition or when the ratio of the pigment exceeds the ratio of the dispersant, settlement occurs in about a week. When the ratio of the dispersant exceeds 20% by weight, furthermore, the viscosity rapidly increase, and the ink can no longer be used for the ink-jet printer. According to the present invention, therefore, the ratio of the dispersant is set as described above thereby to maintain dispersion stability.

It has been said that the pigment used as a coloring material does not appear to be vivid since it permits light to pass through less than the dyestuff. Upon controlling the pigment particles to have an average particle diameter of not larger than 80 nm, however, the printing quality can be improved up to the level of the dyestuff.

Any one of a nonylphenylpolyoxyethylene, a polyoxyethylene mononaphthylether, or a polyoxyethylene laurylether is added as a high-molecular dispersant to the ink. As the surfactant, furthermore, there can be particularly effectively used a diethylhexylsodium sulfosuccinate or a dialkylsuccinate sodium sulfonate.

A water-soluble organic solvent such as a single solvent or a mixture solvent of polyhydric alcohol like diethylene glycol is added to the ink which is a recording liquid in an amount of from 1% by weight to 20% by weight with respect to the amount of the ink. Addition of the glycols works to enhance the effect for maintaining wettability of the ink so that it will not be vaporized, instead of imparting the effect of dispersion. This makes it possible to prevent the ink from coagulating or clogging at the nozzle ejection portions of the ink-jet head.

BRIEF DESCRIPTION OF THE DRAWINGS

The present invention will become more apparent from the following description of the preferred embodiments, with reference to the accompanying drawings, in which:

FIG. 5 is a graph illustrating the relationship between the amount of addition (ratio) of a high-molecular dispersant with respect to the amount of the ink and the viscosity (cps) in the water-based pigment-type ink.

DESCRIPTION OF THE PREFERRED EMBODIMENTS

Figure 1:
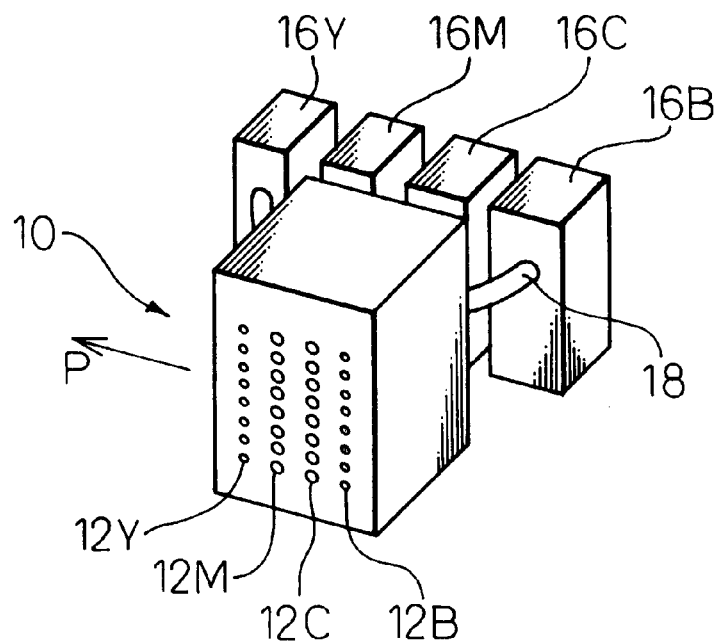
FIG. 1 is a perspective view of a printer head of an ink-jet printer for multi-color printing according to the embodiment of the present invention.
Figure 2:
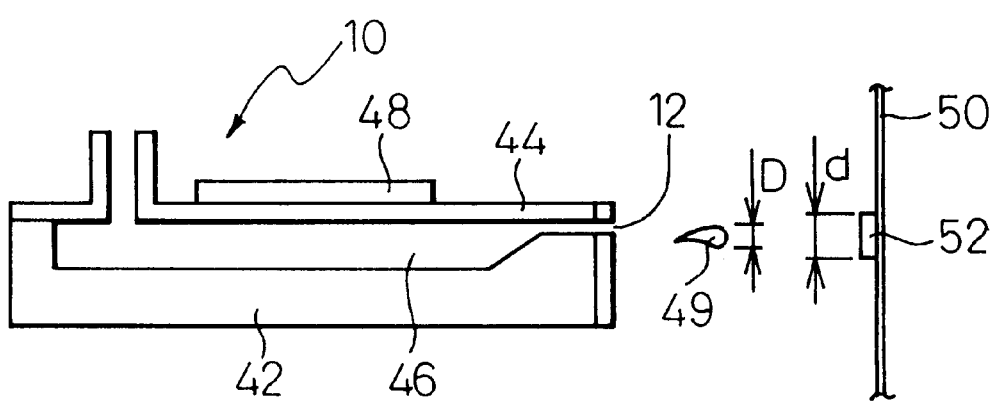
FIG. 2 is a cross-sectional view of a portion of the printer head.

FIGS. 1 and 2 are perspective views illustrating a printer head 10 of an ink-jet printer for multi-color printing according to the embodiment of the present invention. The printer head 10 includes nozzles 12B for black, nozzles 12C for Cyan, nozzles 12M for Magenta, nozzles 12Y for yellow, and ink tanks 16B, 16C, 16M and 16Y. The nozzles can be formed in a nozzle plate. The printer head 10 is supported by a carrier that is not shown and allowed to move in a direction of the arrow P, and the nozzles 12B, 12C, 12M and 12Y of respective colors are arranged in columns in the direction perpendicular to the direction P of motion.

The printer head 10 has ink chambers 46 formed between a nozzle body wall 42 and a flexible wall 44. By expanding and contracting the ink chambers 46 by piezo-electric actuators 48 attached to the flexible wall 44, the ink is ejected as ink droplets 49 to a printing paper 50 through the nozzles 12. The ink droplets adhered to the printing paper 50 are denoted by 52. The size of the ink droplet 49 that is flying is denoted by D, and the size of the ink droplet 49 that has adhered to the printing paper 50 is denoted by d.

The inks of Lour colors (black, cyan, magenta, yellow) are contained in their respective ink tanks 16B, 16C, 16M and 16Y which are communicated with the printer head 10 through their respective feed passages 18. The diameters of the nozzles 12B, 12C, 12M and 12Y of these colors can be varied over a range of from 20 $\mu$m to 50 $\mu$m depending upon the colors of the pigments.

For example, when the particle diameter of the pigment is as small as 20 nm as in the yellow ink, the diameter of the nozzles 12Y of yellow color is decreased to be about 20 $\mu$m. The particle diameter of the black pigment is about 20 nm and, hence, the diameter of the nozzles 12B of black color is decreased to be about 20 $\mu$m. For the particle diameters of as large as 35 to 36 nm of the pigments of Cyan and Magenta inks, the diameter of nozzles 12C and 12M of Cyan and Magenta are increased to be about 50 $\mu$m. This enables the droplet diameter (volume of droplets) of the flying inks ejected from the nozzles to remain nearly constant irrespective of the particle diameters of the pigments.

Described below are further examples of the water-based pigment-type ink. Four kinds of water-based pigment-type inks (Comparative Examples 1 to 3 and Inventive Example 1) having compositions shown in Table 1 below were prepared. The inks of these samples were measured for their chroma and viscosity, and the results are shown in Table 1. Every sample contained phthalocyanine blue as a pigment and a polymer (methacrylic acid-2-phenylethyl methacrylate) as a dispersant.

TABLE 1

|  | Comparative Example 1 | Comparative Example 2 | Comparative Example 3 | Inventive Example 1 |
| --- | --- | --- | --- | --- |
| Pigment (Phthalocyanine Blue) | 4 | 4 | 4 | 4 |
| Dispersant (Polymer) | 6 | 20 | 22 | 6 |
| Fluorescent Pigment | 0 | 0 | 0 | 2 |
| Alcohols | 5 | 5 | 5 | 5 |
| Glycol | 10 | 10 | 10 | 10 |
| Water | 75 | 61 | 59 | 73 |
| Chroma | 72 | 72 | 71 | 80 |
| Viscosity (CPS) | 3.8 | 6.3 | 16 | 3.9 |

Every sample contained the pigment in an amount of 4% by weight, alcohols in an amount of 5% by weight and glycol (diethylene glycol) in an amount of 10% by weight. No fluorescent pigment was contained in Comparative Examples 1 to 3, and the fluorescent pigment was contained in an amount of 2% by weight in Inventive Example 1. The dispersant was contained in an amount of 6% by weight in Comparative Example 1, in an amount of 20% by weight in Comparative Example 2, and in an amount of 22% by weight in Comparative Example 3.

Since no fluorescent pigment was contained in Comparative Examples 1 to 3, the chroma (stipulated under JIS Color System) was as low as 71 to 72. In Inventive Example 1 containing 2% by weight of the fluorescent pigment, the chroma was as high as 80 and was favorable.

Examples of the fluorescent pigments that can be used include those expressed by the following chemical formulas and the structural formulas.

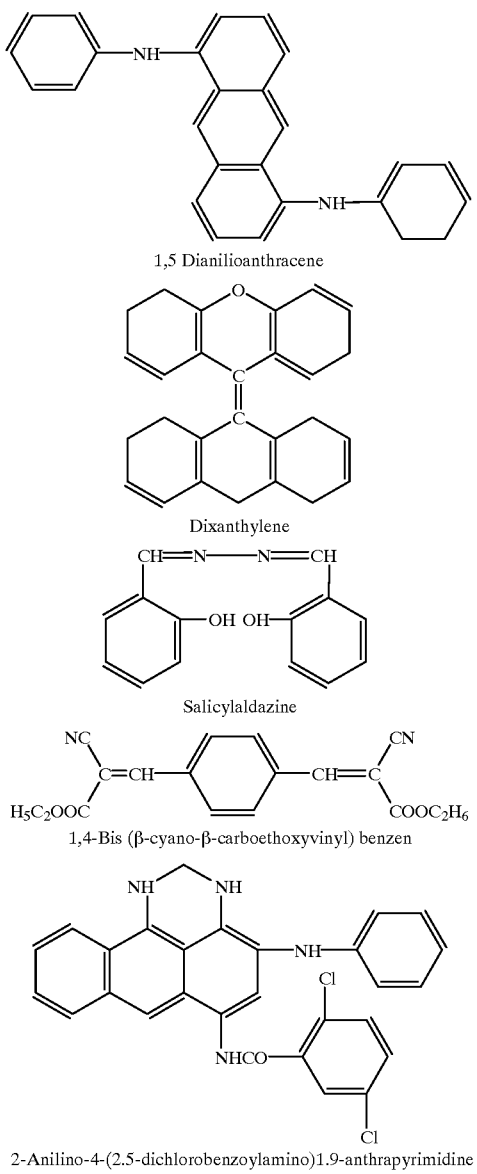

In Comparative Examples 1 and 2, it will be understood that the dispersant was contained in amounts of 6% by weight and 20% by weight, respectively, which were within a range of from 1.2 to 5 times as great with respect to the pigment, and the viscosities (cps) were 3.8 and 6.3 lying within a range suited for use as inks for the ink-jet printer. In Comparative Example 3, however, the dispersant was contained in an amount of 22% by weight which was in excess of 5 times, as a weight ratio, with respect to the pigment, and the viscosity (cps) was as high as 16. Therefore, the ink was not suited for use in the ink-jet printer. In Inventive Example 1, on the other hand, the dispersant was contained in an amount of 6% by weight which was within a range of from 1.2 to 5 times as great, with respect to the pigment, and the viscosity (cps) was 3.9 which was within a range suited for use as an ink for the ink-jet printer.

In the present invention, the water-based pigment-type ink contains at least water, pigment, dispersant and fluorescent pigment, the average particle diameter of the pigment particles being not larger than 0.1 μm and the weight ratio of the pigment to the dispersant being from 1.2 to 5. This is the basic constitution of the present invention. In this Example, a fluorescent pigment is further added to the basic constitution. In the following Examples, however, the basic constitution may further include other features. It need not be pointed out that the fluorescent pigment may be added.

Table 2 shows diameters (volumes) of ink droplets flying from the nozzles determined by a relationship between the particle diameter of the pigment in the color pigment ink and the diameter of the nozzles in the ink-jet head. This Example is based on the above-mentioned basic constitution, and the nozzle diameter is changed to 15 μm, 20 μm, 40 μm, 50μ and 60 μm for the pigments of various colors, i.e., yellow (particle diameter 20 nm), magenta (particle diameter 35 nm), cyan (particle diameter 36 nm) and black (particle diameter 21 nm).

TABLE 2

DIAMETER (VOLUME) OF DROPLET OF FLYING INK

| | Color | | | |
|---|---|---|---|---|
| Nozzle Diameter | Yellow Particle Diameter 20 nm | Magenta Particle Diameter 35 nm | Cyan Particle Diameter 36 nm | Black Particle Diameter 21 nm |
| 15 μm | 35 pl | 15 pl | 15 pl | 30 pl |
| 20 μm | 43 pl | 19 pl | 18 pl | 41 pl |
| 40 μm | 57 pl | 33 pl | 31 pl | 55 pl |
| 50 μm | 69 pl | 45 pl | 44 pl | 67 pl |
| 60 μm | 81 pl | 63 pl | 62 pl | 79 pl |

A preferred amount (volume) of the ink droplet is, for example, from 40 pl to 60 pl. Within the selection ranges of Table 2, therefore, it is desired that the nozzle diameter is 20 μm or 40 μm for yellow, 50 μm for Magenta, 50 μm for Cyan, and 20 μm or 40 μm for black. Thus, by changing the nozzle diameter for the ink of each color, the diameter of droplets (volume of droplets) of the ink ejected from the nozzles can be maintained nearly constant irrespective of the diameter of the pigment particles.

Figure 3:
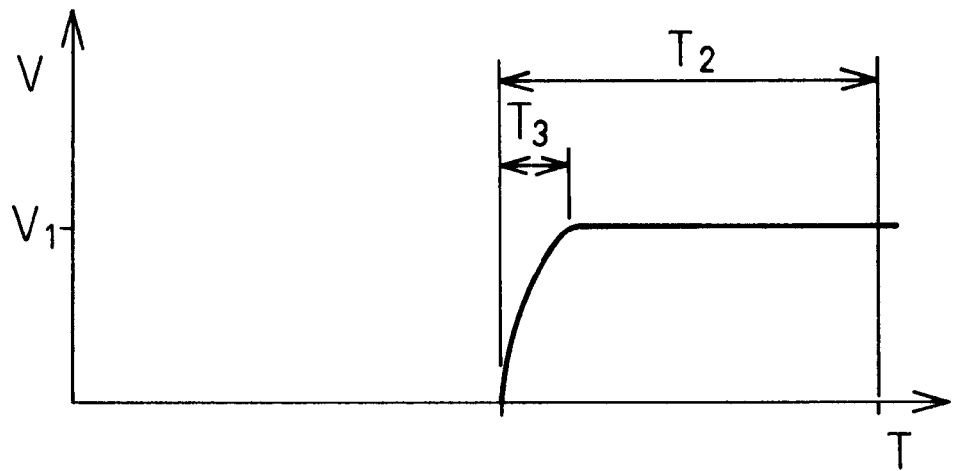
FIG. 3 is a view illustrating the waveform of a pulse voltage applied to the piezo-electric actuator.
Figure 4:
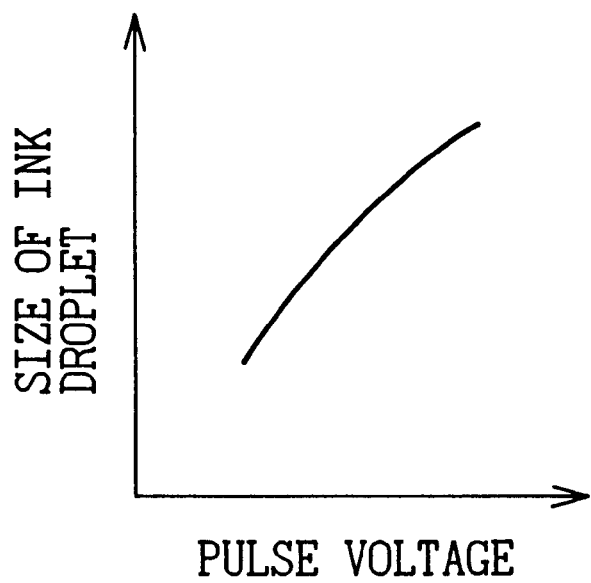
FIG. 4 is a view illustrating a relationship between the pulse voltage and the diameter of the ink droplet.

FIGS. 3 and 4 are views illustrating means for changing the size of ink droplets ejected from the nozzles in at least three sizes when the pigment-type inks having the above-mentioned basic constitution are used. FIG. 3 is a view illustrating a pulse voltage (V) applied to a voltage actuator 48 for ejecting the ink droplets from the nozzles, wherein the abscissa represents the time (T). The pulse voltage includes factors such as a magnitude V1 of pulse voltage, width T2 of pulse voltage and rising time T3. By changing at least one of these factors, the size of the ink droplet that is ejected can be changed.

FIG. 4 is a view illustrating the relationship between the magnitude V1 of pulse voltage and the diameter of the ink droplets that are ejected. By changing the magnitude V1 of pulse voltage, as described above, the diameter of the ejected ink droplets can be changed despite the nozzle diameter remaining the same.

FIG. 5 is a view illustrating the size of ink droplets of when the magnitude V1 of pulse voltage is changed. Upon changing the voltage to 60, 70 and 80 V as shown in Table 3, the amount of the ink droplet that is ejected changes to 20, 50 and 80 pl, and the diameters d (FIG. 2) of the ink droplet 49 adhered to the printing paper 50 are 0.03, 0.06 and 0.10 mm. It is also possible to change the width T2 of pulse voltage and the rising time T3.

TABLE 3

RELATIONSHIP BETWEEN THE PULSE VOLTAGE AND THE LIQUID DROPLET

| Level of Droplet | Voltage (V) | Amount of Droplet (pl) | Droplet Diameter (mm) |
|---|---|---|---|
| Small | 60 | about 20 | 0.03 |
| Intermediate | 70 | about 50 | 0.06 |
| Large | 80 | about 80 | 0.10 |

By using the pigment-type ink and by changing the size of the ink droplets ejected from the nozzles to at least three sizes, it is possible to accomplish a very excellent gray scale display. That is, the pigment-type ink that is ejected and adhered onto the printing paper 50 is not blurred or spread, but maintains a predetermined size. Therefore, the ink does not mix into inks of other colors, and an excellent gray scale display is accomplished.

According to further Examples of the present invention, use is made of water-based pigment-type inks of four colors having the above-mentioned basic constitution, i.e., yellow, magenta, cyan and black and, besides, the black ink contains carbon black and a Cyan-type pigment. Therefore, samples shown in the following Table 4 were prepared and evaluated. In Inventive Examples 2 and 3, a black ink was prepared by using a pigment comprising carbon black and phthalocyanine blue. On the other hand, Comparative Example 4 used carbon black only.

TABLE 4

EXAMPLES OF ADDING A CYANINE PIGMENT TO CARBON BLACK

| | Inventive Example 2 | Inventive Example 3 | Comparative Example 4 |
|---|---|---|---|
| Pigment (Carbon Black) | 4 | 4 | 4 |
| Pigment (Phthalocyanine Blue) | 1 | 1 | 0 |
| Dispersant | 6 | 20 | 22 |
| Alcohols | 5 | 5 | 5 |
| Glycol | 10 | 10 | 10 |
| | (%) | | |
| Water | 74 | 60 | 59 |
| Color Tone (a* b*) | −1, −1 | −1, −1 | 5, 4 |
| Tint | (Bluish Black) | (Bluish Black) | (Reddish Black) |
| Viscosity (CPS) | 3.8 | 6.3 | 16 |

In Inventive Examples 2 and 3, as a result, there were obtained inks of not a reddish black but of a black color at the center of hue balance (a*, b*) of color inks, realizing a good color balance even when mixed with other colors, and exhibiting fastness to light, water resistance, blurring resistance and bleeding resistance. In Comparative Example 4, the ink exhibited a reddish black color, appearing to have a reddish and brownish black color even though it should have been black when mixed with other colors, and lost its color balance. The hue was evaluated based upon the Lab display system stipulated by the Committee of International Illumination (CIF).

The following Table 5 shows the amounts (% by weight) of the samples in Inventive Examples 4 and 5 and in Comparative Examples 5 and 6, and the measured results of dispersion stabilities and viscosities (cps) in these Examples and Comparative Examples.

TABLE 5

| | (% by weight) | | | |
|---|---|---|---|---|
| | Inventive Example 4 | Inventive Example 5 | Comparative Example 5 | Comparative Example 6 |
| Pigment (Carbon Black) | 3 | 8 | 3 | 8 |
| High-Molecular Dispersant | 3 | 20 | 2.5 | 22 |
| Surfactant | 3 | 4 | 1.5 | 5 |
| Glycol | 10 | 10 | 10 | 10 |
| Water | 81 | 58 | 78 | 55 |
| Dispersion Stability | ○ | ○ | x | ○ |
| Viscosity (CPS) | 3.8 | 5.3 | 2.5 | 16 |

Carbon black was used as a pigment, having an average particle diameter of not larger than 80 nm and a maximum particle diameter of not larger than 0.1 μm.

Three kinds of high-molecular dispersants were used, i.e., nonylphenylpolyoxyethylene, polyoxyethylene mononaphthylether, and polyoxyethylene laurylether all exhibiting the same results.

These high-molecular dispersants have the following chemical formulas.

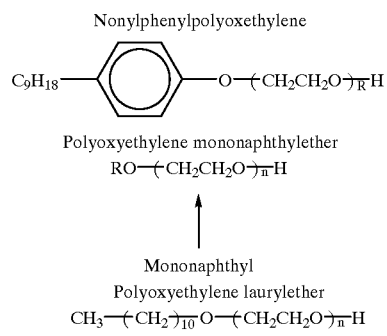

Two surfactants were used, i.e., diethylhexylsodium sulfosuccinate and dialkylsuccinate sodium sulfonate exhibiting, however, the same results.

The dispersion stability was examined by leaving the inks which are the recording solutions of the samples in an atmosphere of 60° C. where the inks are most likely to be degraded for one month. The settling condition (no change in either the particle size or the particle diameter) was examined in this state. The case where not more than 10% of the volume had changed was regarded as being acceptable (○) and the case where more than 10% of the volume has changed was regarded as not being acceptable (X).

The viscosity (cps) was judged to be favorable when it caused no load (a limit cps of 5.3) upon the ink-jet head.

According to the above-mentioned judging criteria, favorable results are obtained when the high-molecular dispersing agent is added in an amount of from 3% by weight to 20% by weight with respect to the amount of the ink, and the surfactant is added in an amount of from 2% by weight to 4% by weight with respect to the amount of the ink.

FIG. 5 is a graph illustrating the relationship between the amount of addition of the high-molecular dispersant and the viscosity (cps). It will be understood from this graph that favorable results are obtained when the amount of addition of the high-molecular dispersant is over a range of from 3% by weight to 20% by weight with respect to the amount of the ink.

The invention was described above in detail with reference to the accompanying drawings. It should, however, be noted that the present invention is in no way limited to the above-mentioned Embodiments only but can be changed or modified in various ways without departing from the spirit and scope of the invention.

According to the present invention as described above, there is obtained a water-based pigment-type ink that exhibits favorable color tone, fastness to light, water resistance, blurring resistance and bleeding resistance as a result of using a pigment ink in combination with a fluorescent ink while maintaining high reliability without causing clogging. In effecting a multi-color printing by using color pigment inks, furthermore, there is obtained an ink-jet head featuring enhanced blurring resistance and bleeding resistance among the colors.

We claim:

1. An ink-jet printer comprising a plurality of ink tanks, each tank containing a different colored ink, and a printer head having nozzles for ejecting inks of different colors, each of said ink tanks containing a water-based pigment ink which comprises water, pigment particles and a dispersant, the pigment particles having an average particle diameter of not larger than 0.1 $\mu$m, and the weight ratio of the dispersant to the pigment being from 1.2 to 5, and the diameter of the nozzles for ejecting one of the inks of one color being different than the diameter of the nozzles for ejecting an ink of a different color and being variable over a range of from 20 $\mu$m to 50 $\mu$m.

2. An ink-jet printer according to claim 1, wherein a fluorescent pigment is further added in an amount of 0.1% by weight to 3% by weight with respect to the amount of the ink.

3. An ink-jet printer according to claim 1, wherein the diameter of the nozzles is nearly the same for a yellow pigment and for a black pigment, is nearly the same for a magenta pigment and for a cyan pigment, and is different for a group of yellow and black, and for a group of magenta and cyan.

4. An ink-jet printer according to claim 1, wherein the diameter of the nozzles for ejecting ink depends on the color of the pigment in the ink being ejected.

5. An ink-jet printer comprising a plurality of ink tanks, each tank containing a different colored ink, and a printer head having nozzles for ejecting inks of different colors, each of said colored inks including a water-based pigment ink which comprises water, pigment particles and a dispersant, the pigment particles having an average particle diameter of not larger than 0.1 $\mu$m, and the weight ratio of the dispersant to the pigment being from 1.2 to 5, said ink-jet printer further comprising a means capable of changing the size of the ink droplets ejected from the nozzles in at least three steps.

6. An ink-jet printer according to claim 5, wherein means for changing the size of the ink droplets ejected from the nozzles includes means for changing at least the magnitude of pulse voltage applied for ejecting the ink droplets, the width of pulse voltage, or the rising time of pulse voltage.

7. An ink-jet printer according to claim 5, wherein said ink-jet printer further includes a piezoelectric actuator and the size of ink droplets ejected from said nozzles is changed by altering the voltage applied to said piezoelectric actuator.

* * * * *